United States Patent
Walters (10) Patent No.: US 7,208,921 B2
(45) Date of Patent: Apr. 24, 2007

(54) DC-DC REGULATOR WITH SWITCHING FREQUENCY RESPONSIVE TO LOAD

(75) Inventor: Mike Walters, Apex, NC (US)

(73) Assignee: International Rectifier Corporation, El Segundo, CA (US)

( * ) Notice: Subject to any disclaimer, the term of this patent is extended or adjusted under 35 U.S.C. 154(b) by 108 days.

(21) Appl. No.: 11/061,907

(22) Filed: Feb. 18, 2005

(65) Prior Publication Data

US 2005/0184717 A1    Aug. 25, 2005

Related U.S. Application Data

(60) Provisional application No. 60/546,119, filed on Feb. 19, 2004.

(51) Int. Cl.
*G05F 1/656* (2006.01)

(52) U.S. Cl. .................. 323/222; 323/284; 327/536

(58) Field of Classification Search ........ 323/282–290, 323/235, 237; 363/48, 53, 56, 89, 127, 71, 363/81, 97
See application file for complete search history.

(56) References Cited

U.S. PATENT DOCUMENTS

| | | | |
|---|---|---|---|
| 3,909,695 A | 9/1975 | Peck | 321/2 |
| 4,085,300 A * | 4/1978 | MacKenzie et al. | 219/625 |
| 4,459,651 A | 7/1984 | Fenter | 363/21 |
| 4,460,951 A | 7/1984 | Fenter et al. | 363/49 |
| 4,733,104 A | 3/1988 | Steigerwald et al. | 307/260 |
| 4,849,869 A | 7/1989 | Tanuma et al. | 363/21 |
| 5,430,633 A | 7/1995 | Smith | 363/20 |
| 5,481,178 A | 1/1996 | Wilcox et al. | 323/287 |
| 5,498,995 A | 3/1996 | Szepesi et al. | 327/538 |
| 5,528,132 A | 6/1996 | Doluca | 323/284 |
| 5,548,206 A | 8/1996 | Soo | 323/284 |
| 5,561,385 A | 10/1996 | Choi | 327/536 |
| 5,617,016 A | 4/1997 | Borghi et al. | 323/284 |
| 5,675,479 A | 10/1997 | Tani et al. | 363/19 |
| 5,729,448 A | 3/1998 | Haynie et al. | 363/97 |
| 5,731,694 A | 3/1998 | Wilcox et al. | 323/287 |
| 5,747,977 A | 5/1998 | Hwang | 323/284 |
| 5,773,966 A | 6/1998 | Steigerwald | 323/284 |
| 5,912,552 A | 6/1999 | Tateishi | 323/285 |
| 6,038,154 A | 3/2000 | Boylan et al. | 363/127 |
| 6,061,253 A | 5/2000 | Igarashi et al. | 363/19 |
| 6,154,381 A | 11/2000 | Kajouke et al. | 363/65 |
| 6,191,964 B1 | 2/2001 | Boylan et al. | 363/89 |
| 6,212,079 B1 | 4/2001 | Balakrishnan et al. | 363/21 |
| 6,291,976 B1 | 9/2001 | Kaminski et al. | 323/283 |
| 6,344,980 B1 | 2/2002 | Hwang et al. | 363/21.01 |
| 6,366,070 B1 | 4/2002 | Cooke et al. | 323/284 |
| 6,433,527 B1 | 8/2002 | Izadinia et al. | 323/300 |
| 6,456,050 B1 | 9/2002 | Agiman | 323/282 |
| 6,462,521 B1 | 10/2002 | Yang et al. | 323/272 |
| 6,462,525 B1 | 10/2002 | Chen | 323/285 |

(Continued)

*Primary Examiner*—Rajnikant B. Patel
(74) *Attorney, Agent, or Firm*—Ostrolenk, Faber, Gerb & Soffen, LLP (57) ABSTRACT

A switch mode power supply in which the switching frequency is controlled by an oscillator having a nominal frequency, and having an error amplifier to provide an output signal which represents departure of the power supply output from a nominal value, and which functions by adjusting the frequency of the oscillator to a frequency which is higher or lower than the nominal frequency according to the value of the error amplifier output signal.

16 Claims, 4 Drawing Sheets

U.S. PATENT DOCUMENTS

| | | | |
|---|---|---|---|
| 6,469,914 B1 | 10/2002 | Hwang et al. | 363/21.01 |
| 6,577,109 B2 | 6/2003 | Dancy et al. | 323/272 |
| 6,580,258 B2 | 6/2003 | Wilcox et al. | 323/282 |
| 6,593,724 B1 | 7/2003 | Chen | 323/283 |
| 6,600,296 B2 | 7/2003 | Hazucha | 323/237 |
| 7,030,596 B1 * | 4/2006 | Salerno et al. | 323/282 |

* cited by examiner

DC-DC REGULATOR WITH SWITCHING FREQUENCY RESPONSIVE TO LOAD

RELATED APPLICATION

The present application is based on and claims the benefit of U.S. Provisional Application No. 60/546,119, filed on Feb. 19, 2004, entitled DC-DC REGULATOR WITH SWITCHING FREQUENCY RESPONSIVE TO LOAD, the entire contents of which are expressly incorporated herein by reference.

FIELD OF THE INVENTION

The present invention relates to switch mode power supplies in which the conventional pulse width modulation (PWM) control of the switching devices is modified to vary the switching frequency so that for light loads, the drive frequency is decreased, and for step load increases, the drive frequency is increased.

BACKGROUND OF THE INVENTION

Switched power supplies have numerous applications in electronic devices and motor drives, and several basic types are well known to those skilled in the art. For purposes of illustration, the invention will be described in the context of a conventional DC-to-DC buck converter that accepts a DC input voltage and produces a lower DC output voltage. Buck converters are typically used in low voltage applications requiring high amounts of load current (e.g., 30 amps or more). It should be understood, however, that the invention is usable in other types of switched power supplies, for example, boost converters.

Figure 1:
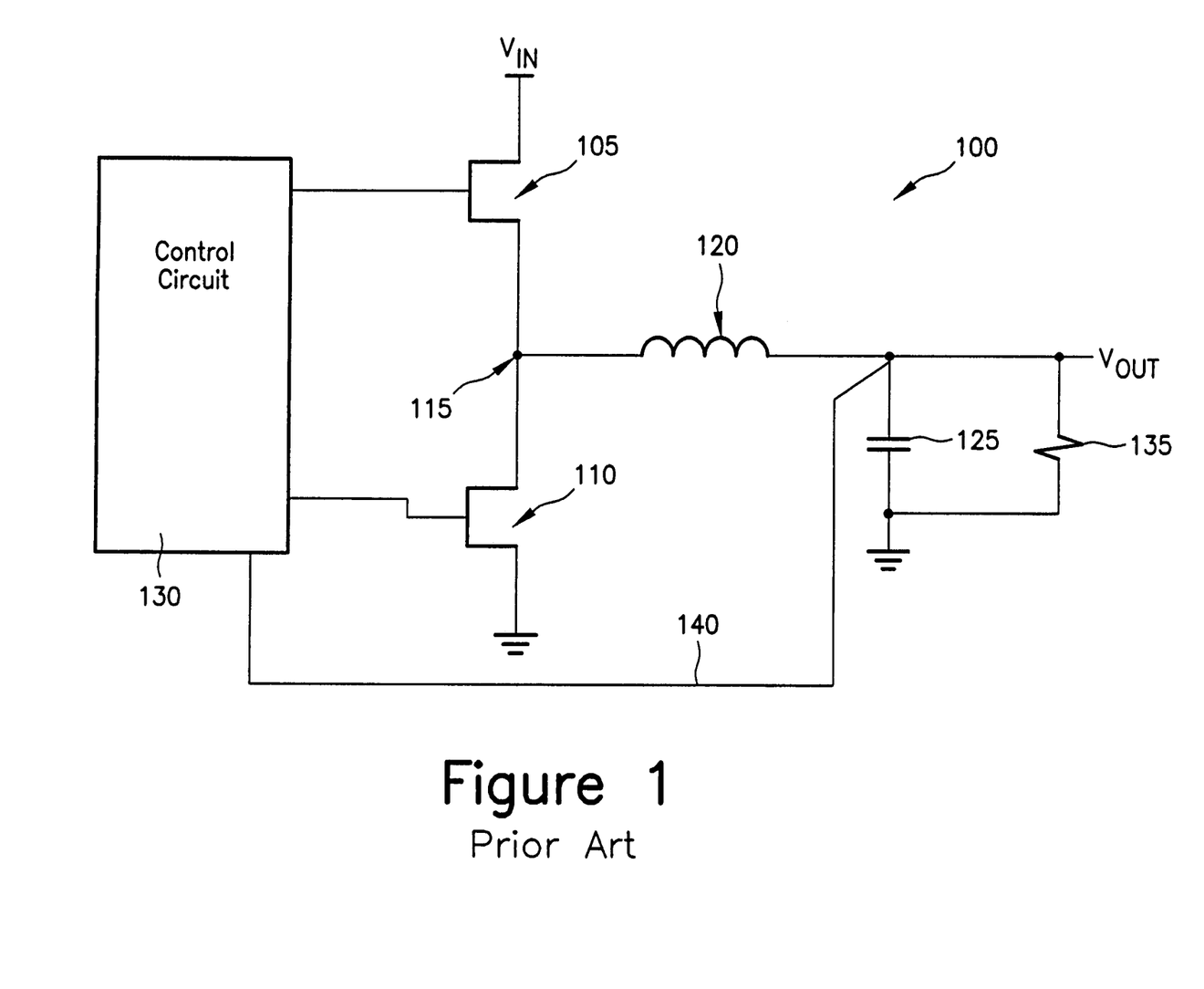
FIG. 1 is a block diagram illustrating the basic construction and operation of a conventional single phase buck converter.

FIG. 1 illustrates a single phase buck converter 100 which includes a high-side switch 105, a low-side switch 110 connected to the high-side switch at a switch node 115, an output inductor 120 connected to the switch node 115, and an output capacitor 125 connected to the output inductor 120. High and low-side switches 105 and 110 may be power MOSFETS, IGBTS, or other bipolar transistors or other suitable devices which can be switched between a highly conductive state and a substantially non-conductive state.

In operation, gate drive signals for the high-side and low-side switches 105 and 110 are provided by a control circuit 130 to produce a desired output voltage across a load 135. For this purpose, control circuit 130 includes an oscillator and logic circuits which control the on and off times of the switches. Thus, when the high-side switch 105 is initially switched on, the low-side switch 110 remains off. This produces a voltage drop across the output inductor 120 of approximately ($V_{IN}$-$V_{OUT}$), which causes a current to build up in the inductor.

The high-side switch 105 is then turned off, and the low-side switch 110 is turned on. Since the inductor current cannot change instantly, it must flow through switch 110 which charges output capacitor 125. This causes the voltage ($V_{OUT}$) across the output capacitor to rise.

Ultimately, as the high-side and the low-side switches 105 and 110 continue to be switched on and off at appropriate times, the voltage ($V_{OUT}$) across the output capacitor 125 ultimately reaches a desired level, which typically, in the case of the buck converter, is lower than the input voltage.

Once the desired output voltage is reached, the switching on and off of the high-side and the low-side switches 105 and 110 continues, with the duty cycle, i.e. the relative on and off times of the switches, being controlled so that the output inductor 120 provides an amount of current equal to the current demand of a load 135 connected across the output capacitor 125. For this purpose, a suitable feedback regulation loop is provided. A circuit included in control circuit 130 receives a signal over a signal path 140 which is used to control the switching times of switches 105 and 110. A sensing device, of which signal path 140 is representative, may be responsive to the output voltage across capacitor 125 to provide so-called voltage mode control, or to the current through output inductor 120, to provide current mode control.

Figure 2:
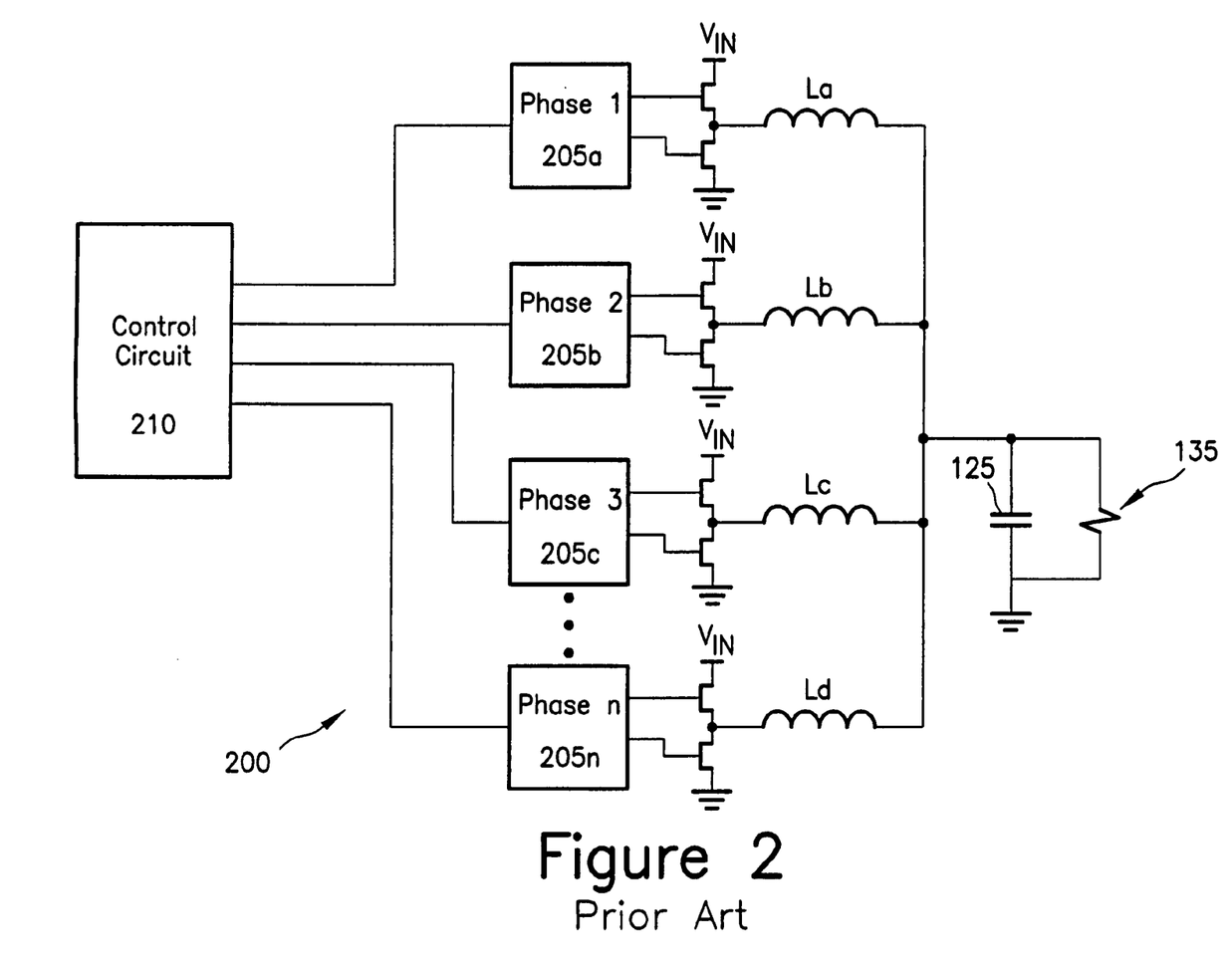
FIG. 2 is a block diagram illustrating the basic construction and operation of a conventional multi-phase buck converter.

By properly controlling the duty cycle, the devices may be made to operate so no more and no less than the current demand of the load 135 is provided, and the voltage ($V_{OUT}$) across the output capacitor 125 remains substantially constant at the desired output voltage with a desired degree of regulation.

Where the current demand of the load exceeds what can conveniently be provided by the circuit of FIG. 1, several such circuits can be combined to form a multi-phase DC-to-DC buck converter. A representative circuit topology for a multi-phase buck converter is shown in FIG. 2, designated generally at 200. This includes a plurality of interleaving output phases 205a, 205b, 205c, . . . , 205n, a multi-phase control circuit 210, and a feedback circuit (not shown) of any suitable design, as will be understood by those skilled in the art. Each output phase includes a high-side switch, a low-side switch, and an output inductor, as in the single phase buck converter 100 of FIG. 1.

The operation of converter 200 is generally the same as that of single phase converter 100. Thus, control circuit 210 periodically operates the output phases in a time-delayed sequence, with a duty cycle determined by the feedback signal, thereby sharing the current generation amongst the phases, and distributing heat generation experienced by the MOSFETS.

For buck converters as described above, the switching times of the high and low side MOSFETS are controlled by a PWM circuit. Typically, this includes an oscillator which generates a triangle wave and suitable logic circuitry which converts the triangle wave to a series of pulses according to an error signal representing the difference between a reference voltage and a voltage derived from the feedback signal. According to conventional practice, a fixed frequency oscillator is employed, and the duty cycle varies according to the value of the error signal. Alternatively, it is known to employ a variable frequency oscillator, with a fixed duty cycle.

Power converters that operate at a fixed switching frequency have desirable electrical noise characteristics. The amplitude of the modulation signal can use the entire common mode range of the control IC and not compromise the amplitude for variable frequency. The fixed frequency enables use of simple filters and blanking techniques to suppress any electrical noise emitted from the converter.

However, the selection of the fixed switching frequency involves a tradeoff of light load efficiency and transient response. A low switching frequency yields the best light load efficiency. A high switching frequency gives the best transient response. Thus, variable frequency operation has potential benefits.

Known techniques, however have associated disadvantages which have rendered them impractical up to now. Among the techniques which have been tried are constant on-time controllers and hysteretic controllers. The hysteretic controllers exhibit unacceptable noise levels because they rely on large output voltage ripple. The constant on-time controllers work well at light load but suffer from the transient delay problem described above.

Digital methods have also been proposed for multiphase converters that respond to a load transient by simultaneously turning on all power channels once the output voltage sags below a threshold. This method can be tuned for a full load step, but with a partial load step, this method turns on all of the power channels and builds up too much total current in the inductors. This causes the voltage to increase and overshoot the regulation value.

As noted above, fixed switching frequency converter is limited in its speed of response to a load transient. As an example, in a voltage-mode buck converter, the turn-on interval of the upper MOSFET starts with a CLK edge. The control generates one CLK edge every switching period so that the CLK frequency is equal to the switching frequency.

At the end of the on-time interval, the upper MOSFET turns off.

Assume that at this instant, a sudden load is applied to the output. The converter must wait for the next CLK edge before the next on-time interval. Meanwhile, the output voltage sags, as the load pulls current from the output capacitor. The output voltage continues to fall until the converter can ramp the inductor current to the new load current. The inductor current increases during the upper MOSFET next turn-on interval which starts at the next CLK edge. The response is delayed for the off-time interval which is equal to the CLK period less the turn-on interval. Therefore, converters with high switching frequency (and a short CLK period) respond faster than converters with low switching frequency.

The converter's efficiency is inversely proportional to the converter's power dissipation. The converter's power dissipation can be thought of in terms of conduction losses and switching losses. The switching losses are power dissipation that is related to the converter's switching frequency. The output inductor's core losses and the MOSFET switching losses are typical of switching power dissipation. These losses increase with increasing switching frequency. At light load, the output power and the conduction losses decrease, but the switching losses stay constant. The resulting efficiency is lower at light load.

The limitation on the speed of response to a load transient with a fixed switching frequency presents another problem in multi-phase converters. Because of the high side switches can not turn on until they receive their CLK signals, there is likely to be mismatch between the output voltages of the individual phases, with possible overloads on one or more phases.

It would therefore be desirable to have a control scheme for a switched power supply which exhibits the desirable noise characteristics of the fixed frequency drive and the fast response to load transients exhibited by a variable frequency drive.

SUMMARY OF THE INVENTION

The present invention achieves the forgoing objective by providing a gate drive circuit for the power switches of a switched power supply which includes an oscillator operating at a fixed clock frequency for moderate loads, but in which the clock frequency is temporarily decreased for light loads, and temporarily increased for large loads.

According to one preferred embodiment, the oscillator includes a controllable current source which feeds or diverts current from a timing capacitor to determine the oscillator frequency. An error amplifier senses the output voltage of the switching regulator and compares it to a reference voltage. The error amplifier is a transconductance amplifier having an output series resistor and capacitor which provides a means for compensating the converter regulator loop. The error amplifier's output current is mirrored in a current mirror and the current is supplied to the clock oscillator circuit to affect the charge/discharge rate of the oscillator capacitor. During moderate load conditions, the error amplifier current is near zero, so the switching frequency is constant. If the error output voltage decreases below a preset value, because of light load conditions, and the output current of the error amplifier corresponds to an inductor current below a critical current, a clamp at the output of the error amplifier clamps the output voltage of the error amplifier to a clamped voltage. This causes the error amplifier to sink current from the clamp which reduces the current to the oscillator thereby reducing the switching frequency. The output voltage is then regulated by varying the switching frequency with a constant on-time. That is, the pulse width during light load operation remains constant but the switching frequency decreases. Stated in another way, the duty cycle decreases because of the increased frequency of the off-time increases with constant on-time. This reduces switching frequency losses because of the lower switching frequency and results in high efficiency at light load.

At higher loads, as the output voltage sags in response to an increased load step, the error amplifier's output increases and the increased current is mirrored and supplied to the oscillator thereby increasing the switching frequency. Thus, the off-time decreases and the switching frequency increases during the load step. Again, the on-time for the high side switch remains constant.

In one preferred embodiment, a direct copy of the error amplifier current is used to adjust the oscillator frequency. However, the actual current supplied to the oscillator can alternatively be scaled if desired. Additionally, the positive and negative current supplied to the oscillator can be separately derived and scaled to optimize the switching frequency characteristics.

Other features and advantages of the present invention will become apparent from the following description of the invention which refers to the accompanying drawings.

DETAILED DESCRIPTION OF EMBODIMENTS OF THE INVENTION

Figure 3:
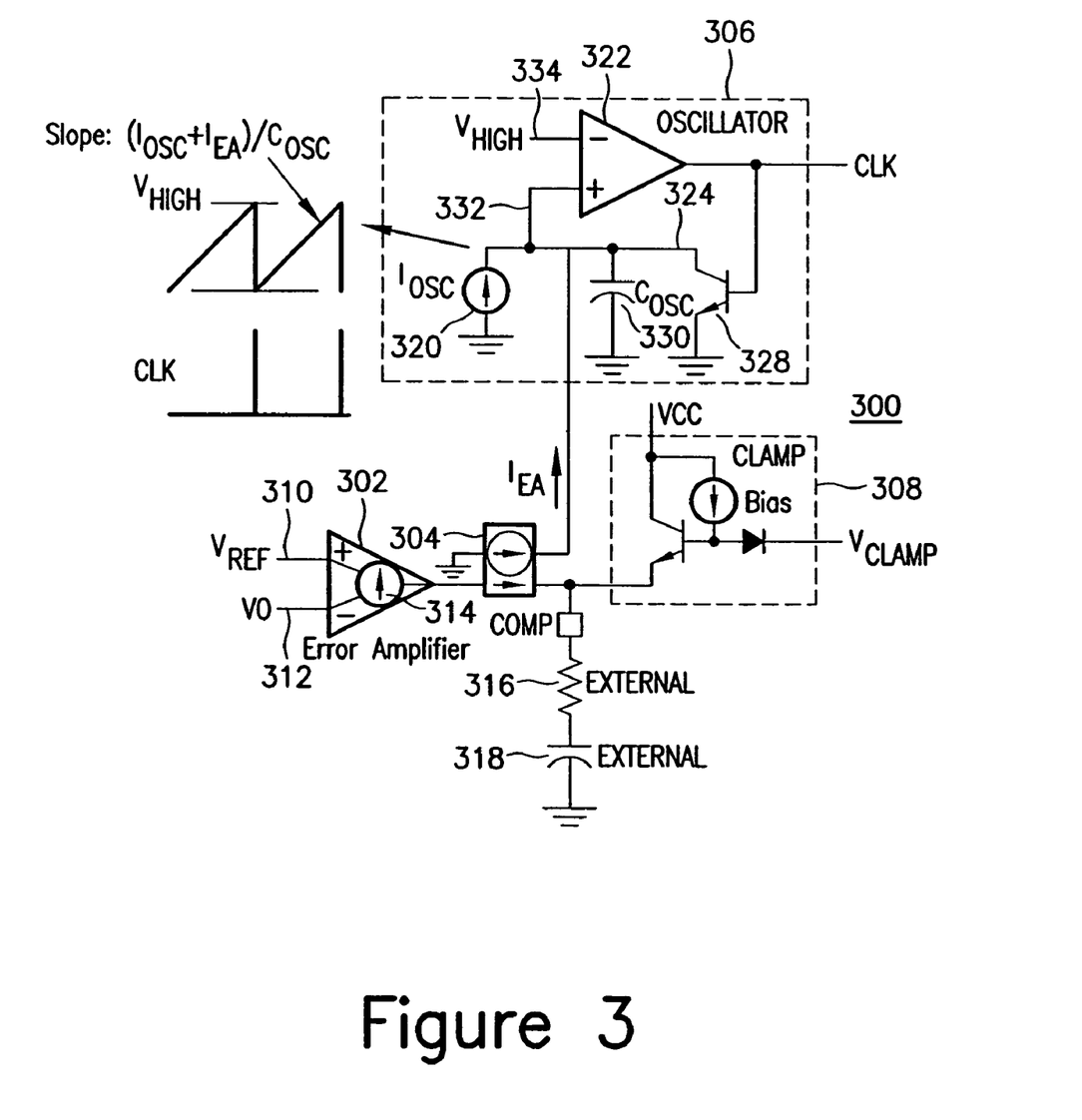
FIG. 3 is a block diagram illustrating the basic functionality of a variable frequency oscillator circuit according to the present invention.

Referring now to FIG. 3, there is shown a first embodiment of a variable frequency gate drive oscillator according to the invention, generally designated at 300. This is intended to be implemented using standard integrated circuit fabrication techniques and circuit designs, and therefore the description will be limited to the system architecture and functionality. Those skilled in the art will readily understand how the invention is to be implemented from the following description using any suitable circuit design.

Frequency controller 300 includes an error amplifier 302, a current mirroring circuit 304, a variable frequency oscillator 306, and a clamping circuit 308. Error amplifier 302 is a transconductance amplifier which receives a reference signal $V_{REF}$ at an input 310, and an error signal $V_O$ at a second input 312, the latter representing a feedback signal from the power supply regulation loop 140 (see FIG. 1). A load circuit for error amplifier 302 comprised of a resistor 316 and a capacitor 318, both external to the integrated circuit constituting driver 300, serves also to compensate the regulation loop.

The voltage controlled current source 314 shown in error amplifier 302 represents a conventional differential transistor pair.

Oscillator 306 includes a current source 320, a comparator 322, and a timing circuit 324 including a timing capacitor $C_{OSC}$ designated as 330 and a transistor 328 which discharges capacitor 330 at the desired time, as described below. First and second inputs for comparator 322 are provided respectively at 332 by current source 320, and at 324 by a frequency reference voltage $V_{HIGH}$. The output of comparator 322 provides the gate drive signal CLK for the high side power switch 105 (see FIG. 1).

In operation, current source 320 charges the capacitor 380 until the capacitor voltage reaches $V_{HIGH}$. At this point, the comparator supplies a CLK pulse and triggers transistor 328 to discharge the capacitor. The CLK frequency is a function of the charge current, the capacitor value $C_{OSC}$ and $V_{HIGH}$. Increasing the charge current increases the CLK frequency. Conversely, decreasing the charging current decreases the CLK frequency.

The ability to alter the frequency of oscillator 306 by varying the charging current for capacitor 330 is utilized according to this invention by mirroring the output current from error amplifier 302 in mirroring circuit 304, and providing the output current $I_{EA}$ to capacitor 330.

As understood by those skilled in the art, a voltage mode converter regulates the output voltage by comparing the error amplifier's output voltage, on COMP to a ramp. The CLK pulse starts a ramp (not shown) and initiates the upper MOSFET's on-time. The upper MOSFET turns on at the CLK edge and turns off when the ramp crosses the error amplifier's output voltage. The error amplifier's output voltage, $V_{COMP}$ is proportional to the converter's duty cycle at a constant switching frequency. When the converter supplies a moderate and static load, the error amplifier's current $I_{EA}$ is near zero. The CLK frequency with a moderate and static load is constant as determined by $I_{OSC}$, $C_{OSC}$ and $V_{HIGH}$.

Clamping circuit 308 the lowest level of the output of error amplifier 302 to $V_{CLAMP}$. This will then set the minimum on-time $t_{ON\text{-}MIN}$ of the voltage-mode converter. When the regulation loop tires to command an on-time lower than $t_{ON\text{-}MIN}$, the error amplifier voltage decreases to $V_{CLAMP}$ and error amplifier continually sinks current from the CLAMP. As previously noted, a copy of the error amplifier current, $I_{EA}$ is subtracted from $I_{OSC}$ to reduce the CLK frequency.

Utilizing gate drive frequency controller 300 in a voltage-mode converter capable of discontinuous inductor current provides a means for regulating the output voltage with variable frequency. At a moderate load, the duty cycle and the error amplifier output voltage $V_{CLAMP}$ is nearly constant. The ideal duty cycle is given by the expression: VO/VIN. In practice, the duty cycle is slightly greater than the ideal to make up for the converter power losses. As the load current decreases, the inductor current will become discontinuous and the ideal expression is no longer valid. The output is regulated by controlling the balance of the inductor energy stored during the on-time and the capacitor energy discharged during the remainder of the CLK interval. The load current boundary between continuous inductor current and discontinuous inductor current is the critical current $I_{CRIT}$.

For load current below $I_{CRIT}$ the duty cycle and the error amplifier reduce below the ideal. Clamping the error amplifier output to $V_{CLAMP}$ causes constant on-time, $t_{ON\text{-}MIN}$ converter pulses. The error amplifier sinks current from the CLAMP, $I_{EA}$ which is subtracted from $I_{OSC}$ to reduce the switch frequency. The output voltage is regulated by varying the switching frequency with a constant on-time. This provides the desirable result of lower switching frequency losses and higher efficiency at light load.

Correspondingly frequency controller 300 is able to decrease the delay time response to an increasing load step by increasing the switching frequency. As the output voltage sags in response to the increasing load step, the error amplifier's output increases and supplies current to the compensation components connected to COMP. A copy of this current $I_{EA}$ is added to $I_{OSC}$ to increase the switching frequency. this decreases the time between CLK edges (delay time) and starts ramping the inductor to the new load current. The result is a decrease in the total output voltage deviation due to the increasing load step.

This characteristic is advantageous in multiphase converters. A step increase of load on a prior art multiphase converter has a similar delay as described above and is further complicated by imbalanced current in the power channel. Multiphase converters typically sequence the turn-on of the power channels at 180° (with respect to switching frequency). They also include circuitry to balance the current delivered from each power channel. By necessity, the current balance control loop is slow so as to not impede the load transient response of the converter. For example, assume that a multiphase buck converter has just turned off the upper MOSFET (at the end of the turn-on interval) in a second power channel and then experiences an increasing load step. The inductor current in the first power channel will start increasing after it receives a CLK edge. The error amplifier will demand a long turn-on interval to try to stop the fall of the output voltage. The inductor current in this power channel increases and could easily exceed its full load rating. Meanwhile, the inductor current in the second power channel cannot increase until its turn-on interval starts at the next CLK edge. The excessive delay time gives rise to a large mismatch in each power channel after a transient that the current balance control must remove. The present invention minimizes such dynamic current mismatch.

In a typical implementation, the nominal load switching frequency is 277 kHz. At a light load of 1 A, the error amplifier's output is clamped to approximately 0.3V and the oscillator frequency is reduced to 62.3 kHz by the error amplifier's current. The output voltage is regulated to 1.2V by adjusting the switching frequency.

A large load transient e.g. 40A, causes the output voltage to sag, and produces a sharp spike on the error amplifier's output. The switching frequency momentarily increases in response to the error amplifier's current. After the voltage returns to the nominal value, the frequency stabilizes back to 277 kHz.

Variations of the above-described circuit functionality are possible within the scope of the invention. For example, in frequency controller 300 (FIG. 1), a direct copy of the output current from error amplifier 302 is used to adjust the frequency of oscillator 306. However, the actual current supplied to oscillator 306 can be scaled to provide desired characteristics. Additionally, the positive and negative current supplied to oscillator 306 can be separately derived and scaled to optimize switching frequency characteristics.

Figure 4:
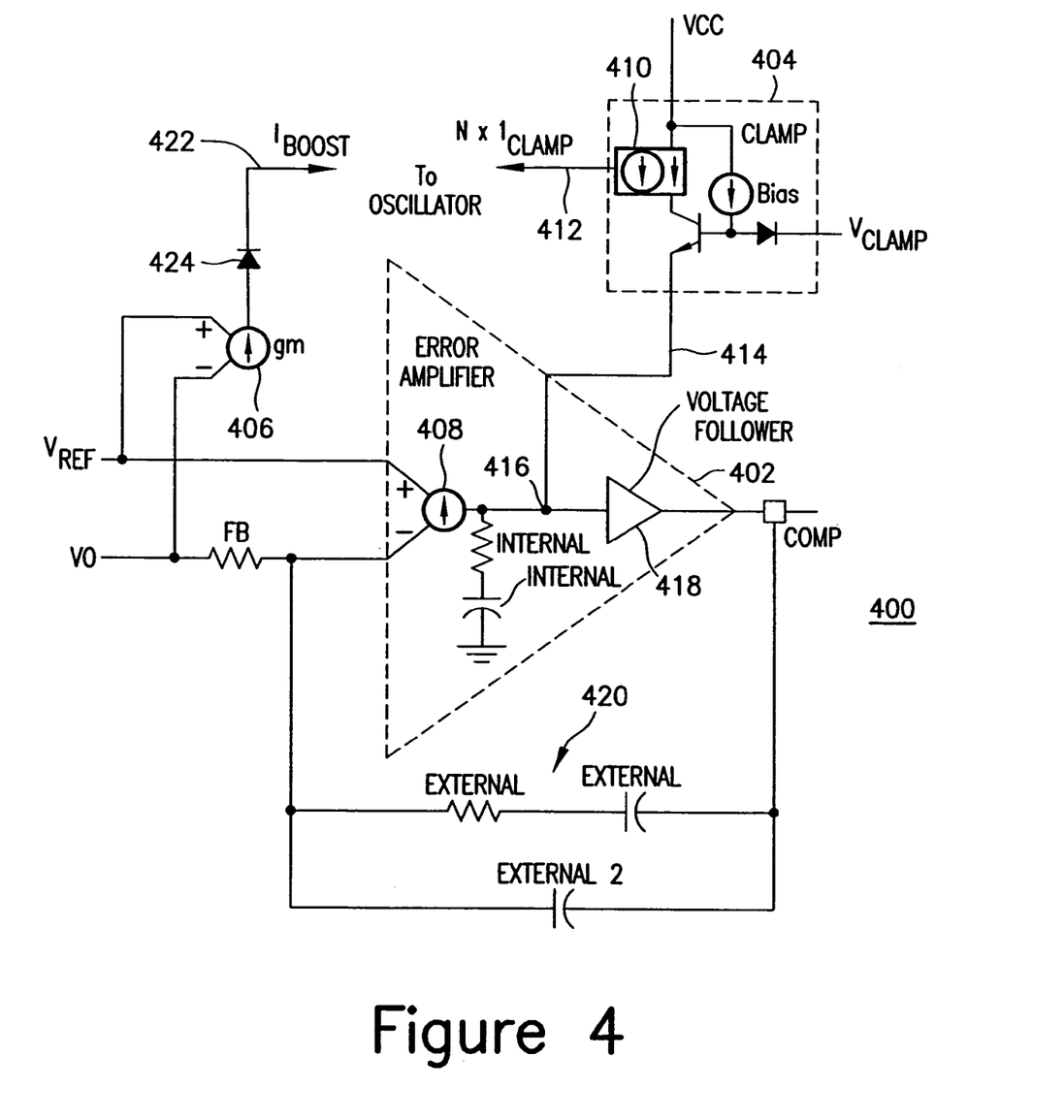
FIG. 4 is a block diagram illustrating the basic functionality of a frequency control circuit according to a further embodiment of the present invention.

FIG. 4 shows an example of a circuit 400 which can be used to separately derive the positive and negative frequency altering currents for the oscillator. This is achieved by use of a modified error amplifier 402, a modified clamping circuit 404 and a transconductance amplifier 406 which is separate from the transconductance functionality 408 provided as part of error amplifier 402.

Clamping circuit 404 is similar to element 308 in FIG. 3, except that it also includes a mirroring circuit 410 which provides a copy of the clamping current at output 412. The actual clamping current may additionally be scaled as desired, independent of the error amplifier current. The output of clamping circuit 404 is provided from output 412 as an input to the oscillator (not shown) which is identical to oscillator 306 in FIG. 3, and is subtracted from $I_{OSC}$ to reduce the oscillator frequency.

Error amplifier 402 in FIG. 4 provides conventional operational amplifier functionality, with the clamping current provided over a signal path 414 to a high impedance node 416 at the output of the voltage controlled current source 408. Node 416 is buffered by a unity gain voltage follower output stage 418. The converter control loop is compensated by the external resistor-capacitor network 420.

Independent transconductance amplifier 406 monitors $V_O$ relative to $V_{REF}$, and the difference current is provided at 422 to vary the frequency of the oscillator as in FIG. 3. Any deviation of the output voltage below the reference produces the current $I_{BOOST}$ that increases the oscillator frequency. A diode 424 is provided to assure that that $I_{BOOST}$ is a positive current.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A switch mode power supply comprising:
   high and low side semiconductor switches; and
   a drive circuit for turning the high and low side semiconductor switches on and off, the drive circuit being comprised of:
   a variable frequency oscillator to provide a signal which determines the switching frequency for the high and low side semiconductor switches, the oscillator having a nominal frequency;
   an error amplifier to provide an output signal which represents departure of the power supply output from a nominal value;
   an adjusting circuit including a controllable current source which feeds or diverts current from an oscillator timing capacitor to determine the oscillator frequency, the adjusting circuit is responsive to departure of the power supply output from the nominal value to adjust the frequency of the oscillator to a frequency which is higher or lower than the nominal frequency according to the departure of the power supply output from the nominal value; and
   a clamping circuit which provides a signal defining a minimum on-time for the high-side semiconductor switch.

2. A switch mode power supply according to claim 1, wherein:
   the error amplifier output is a current which is provided as an input to the adjusting circuit; and
   the adjusting circuit provides a current to the oscillator to alter the charge/discharge rate of the oscillator timing capacitor.

3. A switch mode power supply according to claim 2, wherein the error amplifier is a transconductance amplifier.

4. A switch mode power supply according to claim 2, wherein the adjusting circuit is a current mirroring circuit which is responsive to the output of the error amplifier to provide a mirror of the amplifier output current to the oscillator capacitor to alter the charge/discharge rate thereof.

5. A switch mode power supply according to claim 2, wherein the oscillator operates at the nominal frequency when the error amplifier output current is close to zero.

6. A switch mode power supply according to claim 2, wherein the error amplifier output is coupled as an input to the clamping circuit; and
   the output of the clamping circuit is coupled as an input to a duty cycle control circuit which is responsive to the clamping circuit output and to an output signal from the oscillator to turn on the high side switch at intervals determined by the oscillator frequency and for durations determined by the clamping circuit output.

7. A switch mode power supply according to claim 6, wherein the clamping circuit is responsive to an output of the error amplifier below a voltage corresponding to a predetermined light load condition, to provide a fixed minimum output signal as the input of the duty cycle control circuit.

8. A switch mode power supply according to claim 7, wherein the clamping circuit is operative when the error amplifier output is below the predetermined light load voltage, to reduce the current provided by the adjusting circuit to the oscillator timing capacitor, whereby the frequency of the oscillator is reduced, and the power supply output voltage is regulated by varying the switching frequency with a constant on-time for the high side switch.

9. A switch mode power supply according to claim 2, wherein the adjusting circuit is responsive to increases in the error amplifier output current to increase the current provided to the oscillator timing capacitor, whereby oscillator frequency and the switching frequency for the high and low side switches is increased.

10. A switch mode power supply according to claim 1, wherein the error amplifier output is coupled as an input to the clamping circuit; and
    the output of the clamping circuit is coupled as an input to a duty cycle control circuit which is responsive to the clamping circuit output and to an output signal from the oscillator to turn on the high side switch at intervals determined by the oscillator frequency and for durations determined by the clamping circuit output.

11. A switch mode power supply according to claim 10, wherein the adjusting circuit is responsive to increases in the error amplifier output current to increase the frequency of the oscillator, whereby the switching frequency for the high and low side switches and the on time for the high side switch is increased.

12. A switch mode power supply according to claim 10, wherein the clamping circuit is responsive to an output of the error amplifier below a voltage corresponding to a predetermined light load condition, to provide a fixed minimum output signal as the input of the duty cycle control circuit.

13. A switch mode power supply according to claim 12, wherein:
the adjusting circuit is responsive to the error amplifier output current; and
the clamping circuit is operative, when the error amplifier output is below the predetermined light load voltage, to reduce the current provided to the adjusting circuit, whereby the frequency of the oscillator is reduced, and the power supply output voltage is regulated by varying the switching frequency with a constant on-time for the high side switch.

14. A switch mode power supply according to claim 1, wherein:
the adjusting circuit includes a voltage controlled current source which is responsive to a transient increase in the power supply load to provide a current of a first polarity to increase the frequency of the oscillator.

15. A switch mode power supply according to claim 14, wherein the clamping circuit includes a portion of the adjusting circuit which is operative to provide a current of opposite polarity to decrease the frequency of the oscillator.

16. A switch mode power supply according to claim 15, wherein the portion of the adjusting circuit included in the clamping circuit is comprised of a current mirroring circuit which is responsive to the output of the error amplifier to provide a mirror of the amplifier output current to the oscillator.

* * * * *